United States Patent [19]

Cantarutti

[11] 4,105,486
[45] Aug. 8, 1978

[54] TIRE COMPONENT TRANSFER

[75] Inventor: Armindo Cantarutti, Akron, Ohio

[73] Assignee: NRM Corporation, Akron, Ohio

[21] Appl. No.: 782,990

[22] Filed: Mar. 30, 1977

[51] Int. Cl.² .................... B29H 17/20; B29H 17/37
[52] U.S. Cl. ............................... 156/405 R; 156/126;
214/DIG. 3; 248/278
[58] Field of Search ................... 156/123 R, 126, 127,
156/128 R, 129, 131, 133, 394, 396, 403, 405;
211/20, 23; 214/451, DIG. 3, DIG. 4, DIG. 10;
248/274, 278, 62; 29/235

[56] References Cited

U.S. PATENT DOCUMENTS

| | | | |
|---|---|---|---|
| 2,706,658 | 4/1955 | Jewell | 214/DIG. 3 |
| 3,374,138 | 3/1968 | Porter et al. | 156/403 |
| 3,434,897 | 3/1969 | Caretta et al. | 156/403 |
| 3,475,254 | 10/1969 | Henley | 156/123 |
| 3,740,292 | 6/1973 | Leblond | 156/126 |
| 3,865,669 | 2/1975 | Todd | 156/133 |
| 3,865,670 | 2/1975 | Habert | 156/126 |

*Primary Examiner*—David Klein
*Assistant Examiner*—John E. Kittle
*Attorney, Agent, or Firm*—Maky, Renner, Otto & Boisselle

[57] ABSTRACT

Apparatus for transferring a tire component such as a belt and tread assembly includes an annular supporting frame with a plurality of radially movable component gripping sectors mounted on the frame at equal circumferentially spaced locations, each of the sectors being carried by a pair of radially spaced generally parallel links pivotally connected to the frame and to the sectors. An actuating ring is movable circumferentially of the frame and for each sector, an actuating link extends generally axially between the ring and at least one of each pair of links to pivot the links radially upon circumferential movement of the actuating ring. In this manner, the sectors move radially uniformly. The links are connected to one common side of the sectors by fasteners projecting from the other common side so that a different set of sectors may readily be installed. An adjustable stop limits the movement of the sectors. The frame is transported from one position to another to transfer the tire component.

15 Claims, 6 Drawing Figures

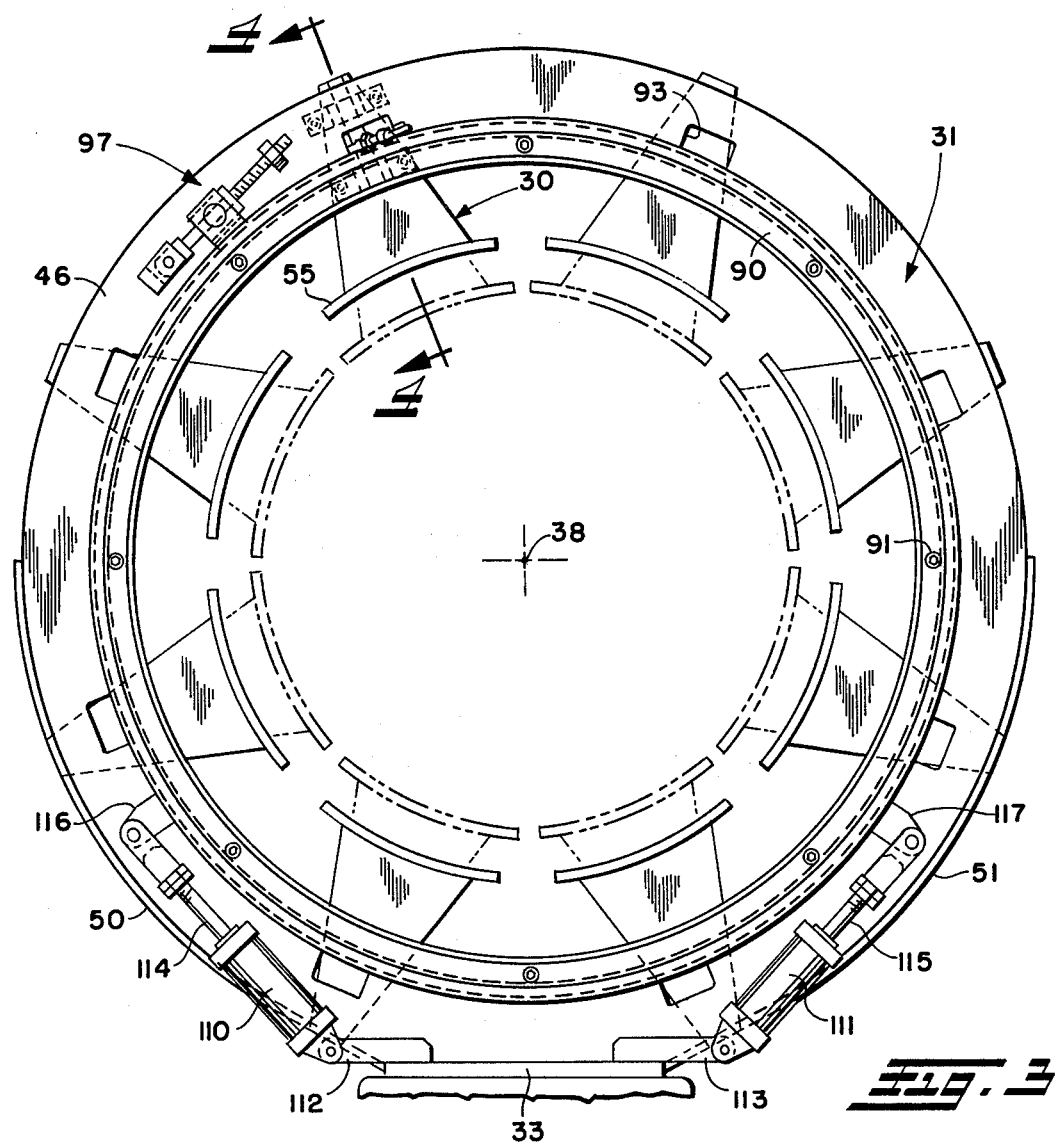
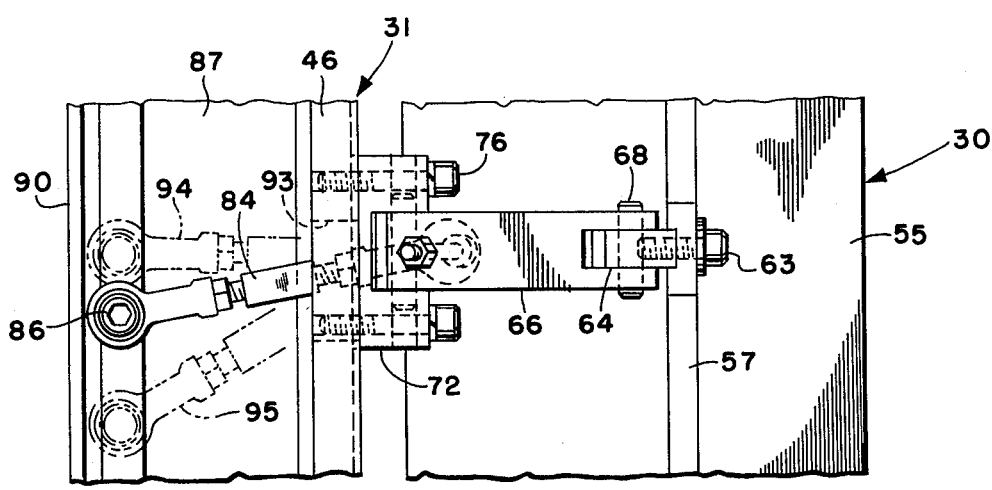

TIRE COMPONENT TRANSFER

This invention relates generally as indicated to a tire component transfer and more particularly to a transfer which may quickly and easily be modified to accommodate a wide variety of sizes of components.

Tire components such as belt and tread assemblies are transferred from one location to another, oftentimes in a tire building process. For example, belt and tread assemblies may be transferred from the drum on which they are built to a drum on which the carcass is mounted for assembly therewith.

Such transfers are normally of the pneumatic bag chuck type. However, such transfers have limited size capability and such bags are subject to wear, expensive to fabricate, and are difficult to replace.

It is accordingly desirable to provide a transfer not utilizing annular air bags, but rather employing a few common, easily manufactured parts which can readily be replaced.

It is accordingly a principal object of the present invention to provide a tire component transfer of simplified construction with relatively few common and replaceable parts.

A further important object is the provision of a tire component transfer wherein the chuck segments are driven mechanically for uniform radial movement by the rotation of a ring.

Still another object is the provision of a tire component transfer wherein the sectors of the chuck include radially extending stems which are supported on one common side with fasteners having access on the opposite common side.

A still further object is the provision of a tire component transfer wherein the sectors are each supported from an annular frame by a parallelogram linkage.

These and other objects and advantages of the invention will become apparent as the following description proceeds.

To the accomplishment of the foregoing and related ends, the invention, then, comprises the features hereinafter fully described and particularly pointed out in the claims, the following description and the annexed drawings setting forth in detail certain illustrative embodiments of the invention, these being indicative, however, of but several of the various ways in which the principles of the invention may be employed.

In said annexed drawings:

FIG. 3 is a further enlarged fragmentary axial or end elevation of the transfer as seen from the line 3—3 of FIG. 2 with certain parts omitted for ease of illustration;

FIG. 4 is an enlarged fragmentary radial section taken substantially on the line 4—4 of FIG. 3 illustrating a sector and the manner in which it is supported from the frame;

Figure 1:
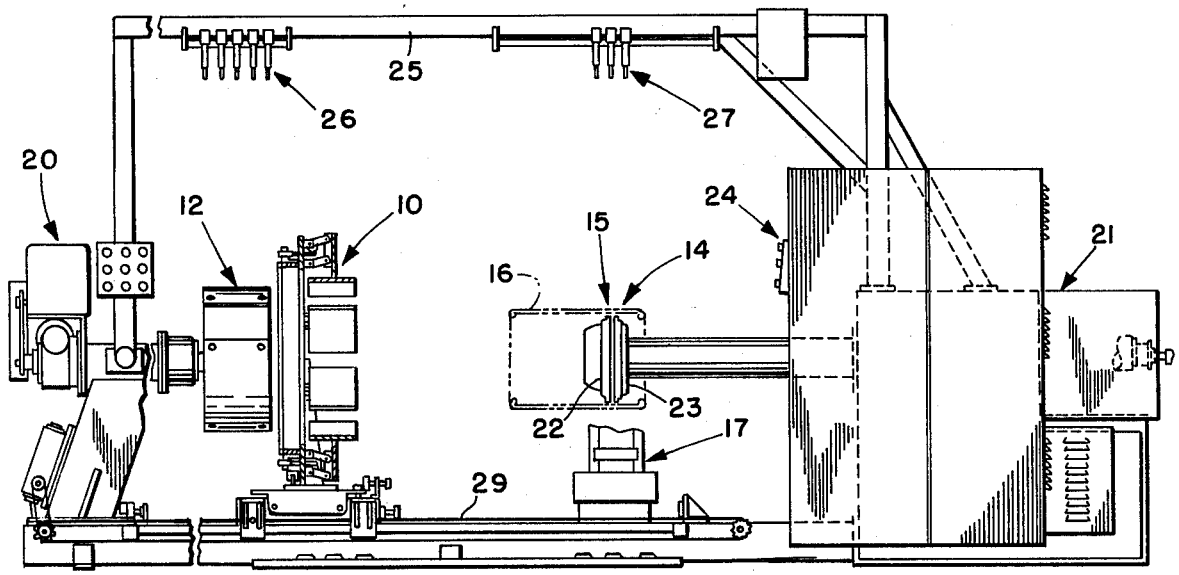
FIG. 1 is a front elevation of the components of a tire building system in which the transfer of the present invention may be used, with the transfer in diametral section, and with some of the other parts broken away.

Referring now to the annexed drawings and more particularly to FIG. 1, there is illustrated the components of a radial tire building system, one of such components indicated at 10 being the transfer of the present invention. The transfer is in essence an annular chuck adapted to grip the component from the outside and to move the component from one location to another. In the system illustrated, the two locations may be typified by a tread and belt building drum indicated at 12 and a second stage tire building machine indicated at 14. It is the function of the transfer to grip and engage the belt-tread assembly after it is made on the drum 12. The drum 12 is then collapsed, and the transfer then carries the belt-tread assembly to the center line 15 of the second stage machine, and holds the belt-tread assembly in such position until the first stage carcass shown at 16 is shaped by the second stage machine into the belt-tread assembly. Then the transfer releases the belt-tread assembly and moves to the position shown to permit the belt-tread assembly to be stitched to the shaped carcass by a suitable stitching mechanism indicated at 17. While the belt-tread assembly is being stitched to the carcass, another belt-tread assembly is being made on the drum 12. Reference may be had to the copending application of George E. Enders entitled "Tire Building Machine", Ser. No. 814,196, filed July 11, 1977, for a disclosure of the construction and operation of the second stage machine 14.

The drum 12 includes a drive assembly 20 for expanding and contracting the drum as well as rotating the same. The second stage machine includes a main housing 21 which includes the main power unit for the flanges 22 and 23 of the second stage drum. A control panel 24 is provided to the operator's right. The system also may include a guide light bracket 25 supporting guide light projectors as indicated at 26 and 27 to assist the operator in positioning various tire components on the drum 12 or carcass 16, respectively.

In order to move the transfer from its pickup to its deposit position, the transfer is mounted on suitable rails or guides 28 and driven along such guides by a reversible, positive stop chain drive as indicated at 29.

Figure 2:
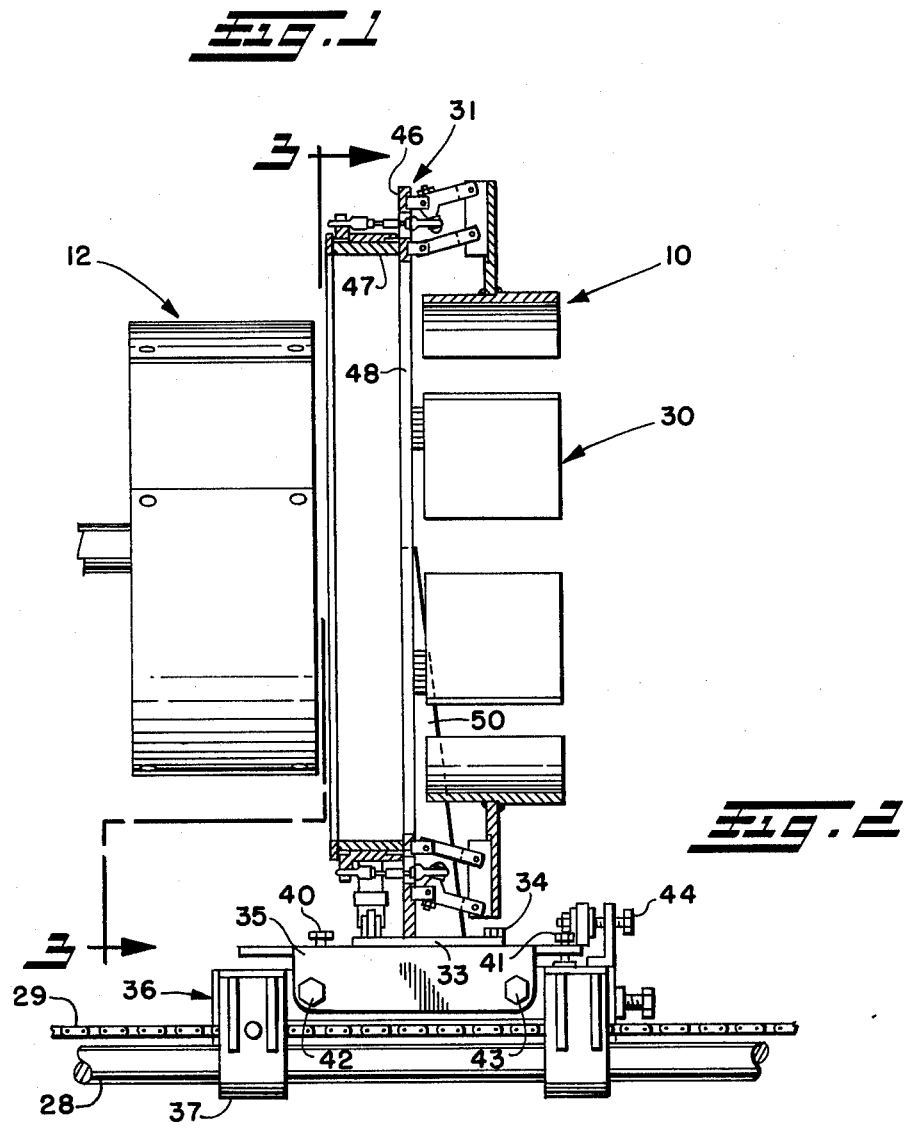
FIG. 2 is an enlarged fragmentary view of the portion of FIG. 1 illustrating the transfer.

Referring now to FIGS. 2 and 3, it will be seen that the transfer 10 includes a series of sectors 30 which are supported on and driven for radial movement from annular frame 31. The sectors are equally cicumferentially spaced about the annular frame and are each identical. As indicated in FIG. 3, there are eight such sectors, but it will be appreciated that more or fewer may be employed.

The annular frame 31 includes a horizontal base plate 33 which is secured by fasteners 34 to frame 35 which is in turn adjustably supported on main carriage frame 36. The latter includes four depending legs 37, mounted for sliding movement on the guides 28.

A series of adjustments are provided between the frames 35 and 36 so that the center 38 of the frame seen in FIG. 3 can be properly and precisely aligned with the axis of the drum 12 and the drum of the second stage machine. For example, vertical adjustment may be obtained by the leveling adjustment screws shown at 40 and 41 while horizontal adjustment and alignment may be obtained by the screws indicated at 42 and 43 in FIG. 2. Axial adjustment may be obtained by the adjustment screw 44. Such adjustments, as seen in FIG. 2, provide for transfer concentricity and squareness.

As seen perhaps more clearly in FIG. 4, the frame 31 includes a first annular plate 46 in a plane normal to the axis 38 and a second cylindrical plate or ring 47 extending to one side thereof near the large annular opening 48 in the first plate. The axis of both portions of the frame is the axis 38. The two main plates forming the frame rigidify each other and may be secured together as by welding. To rigidify the frame on the base plate 33, two circular gussets are provided as indicated at 50 and 51 in FIG. 3.

Since the sectors 30 are each identical in form, and since they are supported and driven from the frame 31 in the same manner, only one sector, its connection and drive, will be described in detail.

Figure 5:
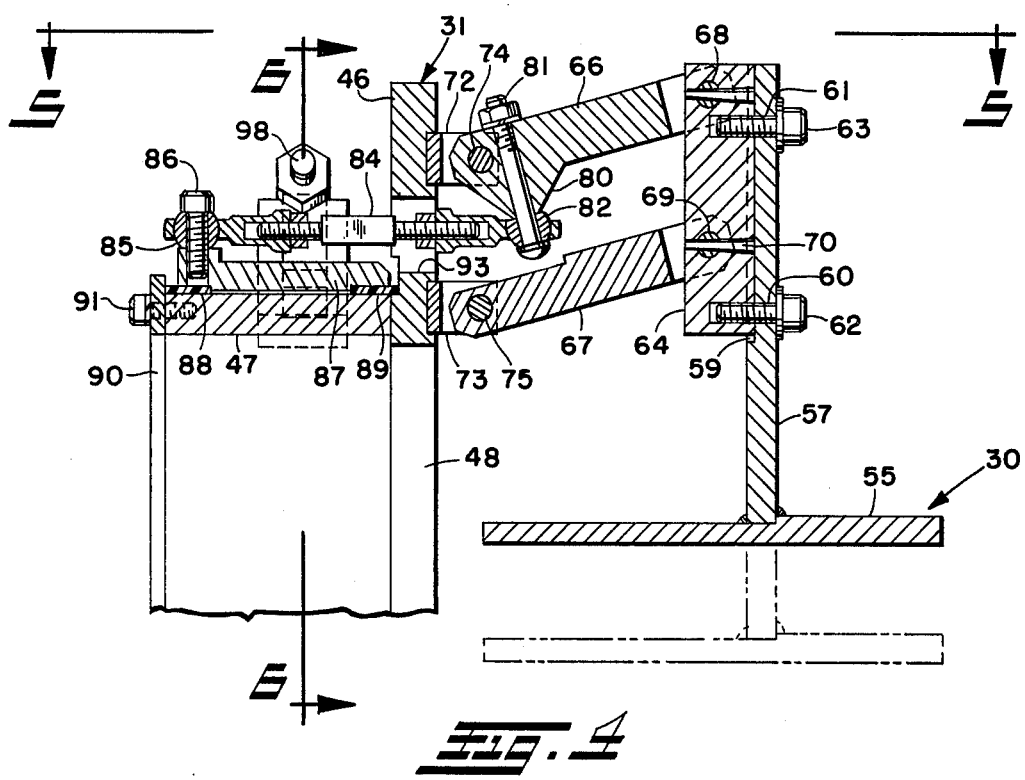
FIG. 5 is a fragmentary top plan view as seen from the line 5—5 of FIG. 4.
Figure 6:
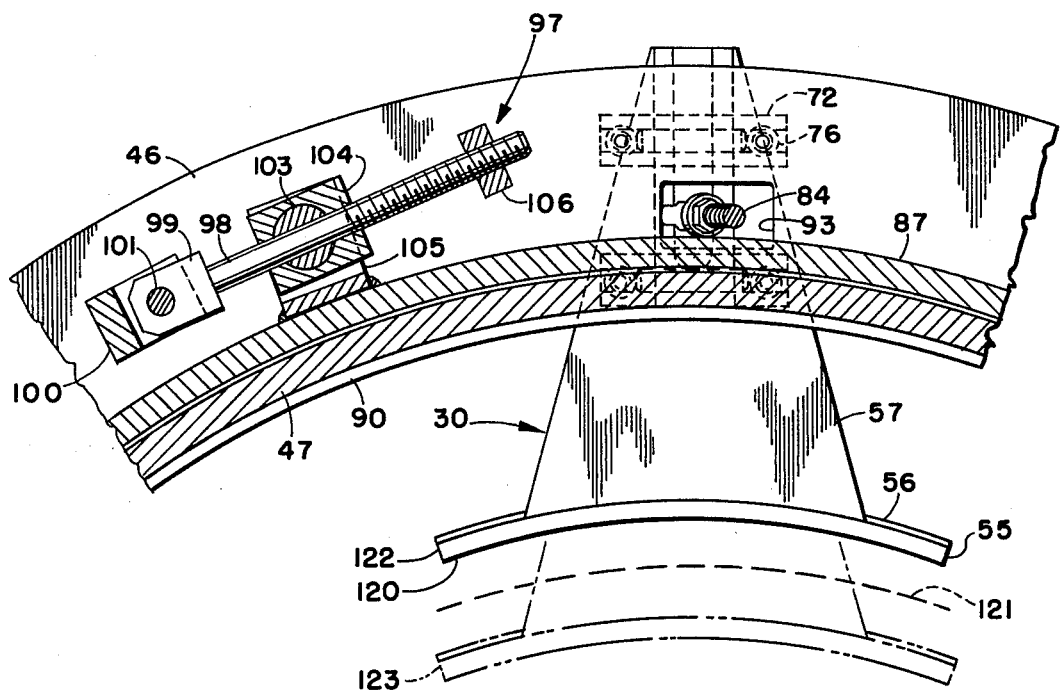
FIG. 6 is a fragmentary vertical section taken substantially from the line 6—6 of FIG. 4 also illustrating the adjustable stop.

Referring now more particularly to FIGS. 4, 5 and 6, it will be seen that each sector 30 includes a circular segment of a cylinder of uniform radius as indicated at 55. The interior of each segment presents a smooth cylindrical surface of uniform radius while the exterior is provided with a step or shoulder as indicated at 56 against which is secured a truncated triangular stem 57. The stem of each sector lies in a common plane normal to the axis of the transfer. The outer end of each stem on one common side thereof is provided with a radially extending slot or keyway as indicated at 59. Two radially spaced apertures in such slot seen at 60 and 61 accommodate fasteners 62 and 63, respectively. The fasteners are employed to secure radially extending key 64 in the slot or keyway.

The key 64 is connected to the radially extending plate 46 of the frame 31 by equal length parallelogram links 66 and 67. Such links are bifurcated at their outer ends and connected to the key by pins 68 and 69, each held in place in the key by the taper pins indicated at 70.

The inner ends of such links are connected to vertically spaced blocks 72 and 73 by pins 74 and 75, respectively. The blocks are each seated in recesses in the face of the plate 46 and secured thereto by fasteners seen at 76 in FIG. 5. The blocks are positioned on the face of the plate 46 such that the vertical spacing of the pins 74 and 75 is identical to the vertical spacing of the pins 68 and 69, thus to form the parallelogram linkage. In this manner, the stem will always remain parallel to the plate 46, both being always normal to the axis 38. The configuration of the blocks 72 and 73 is seen more clearly in FIG. 5.

The lower inner portion of the upper link 66 is radially inwardly offset as indicatd at 80 and an elongated fastener 81 extends through the link at such offset supporting spherical bushing 82 on the underside of the offset. An adjustable drag link or tie rod 84 extends between the spherical bushing 82 and a further spherical bushing 85 which is secured by fastener 86 to the outside ridged edge of drive ring 87.

The interior of the drive ring is shouldered at its edges and seated on and between suitable annular bushings or bearing strips 88 and 89 which surround the exterior of the cylindrical plate 47 of the frame 31. A retainer 90 is secured by fasteners 91 to the projecting end of the cylindrical plate or ring 47. The bushing or bearing strips may, for example, be of an elastomeric material having low frictional properties such as nylon, or TFE and FEP fluoroplastic resins. Fillers may be included to provide the desired wear properties.

It is noted that the tie rod 84 extends through a rectangular window 93 in the radially extending plate 46, such window being offset from the center of the parallelogram links as seen in FIG. 6. This permits the tie rod or link to swing from the phantom line position 94 to the phantom line position 95 seen in FIG. 5 as the ring 87 rotates. Rotation of the ring to move the tie rod connection and thus the tie rod from the position 95 to the position 94 will fully retract the sectors 30. Conversely, rotation of the ring 87 to position the tie rod in the position 95 seen in FIG. 5 will fully contract the sectors. In such position 94, the tie rod extends axially of the transfer and the sectors are in effect toggle locked in the open position.

In order to limit the rotation of the ring, there is provided an adjustable stop as seen at 97 in FIGS. 3, 4, and 6. The stop 97 comprises a rod 98, the head 99 of which is pin connected to block 100 as indicated at 101, such block being welded to the side of plate or ring 46.

The rod 98 extends through a diametral hole in bronze pin 103 which is supported by block 194, the rod also extending through such block. The ends of the pin 103 project from the block and are pivotally supported in apertures in the arms of U-shape or clevis block 105 which is in turn welded to the exterior of the drive ring 87. The rod may have a diameter of approximately 12.70 mm while the hole in the bronze pin and the surrounding block may be approximately 13.49 mm. The end of the rod is threaded and provided with an adjustable stop nut 106. Accordingly, as the drive ring 87 rotates to the right as seen in FIG. 6, the nut 106 will contact the face of the block 104 limiting further movement. The rod may be graduated with certain indicia as an aid in adjustment. The adjustment will be such that the segments will contract to engage and grip the circular tire component without exerting excessive pressure thereon.

Rotation of the drive ring 87 is obtained by the piston-cylinder assemblies 110 and 111 seen, for example, in FIG. 3. The blind ends of the piston-cylinder assemblies 110 and 111 are pivotally connected to horizontally extending brackets 112 and 113, respectively, secured to the base plate 33. The eyes of the respective rods 114 and 115 are pivotally connected to brackets 116 and 117 extending radially from the drive ring. Such piston-cylinder assemblies may be pneumatic and single acting having a relatively short stroke such as 7.62 cm. Thus extension of the piston-cylinder assembly 110 and the venting of the other will move the ring in a clockwise direction as seen in FIG. 3. The venting of the piston-cylinder assembly 110 and the extension of the piston-cylinder assembly 111 will move the drive ring in a counterclockwise direction as seen in FIG. 3.

Referring now to FIG. 6, it will be seen that the interior surface 120 of the segments 55 may be designed to form a perfect circle at a median positon 121 between the fully open position shown in full lines at 122 and the fully closed position shown in phantom lines at 123. In this manner, distortion of the interior circular surface of the segments is maintained at a minimum. The range of movement of the segments on either side of the median may be approximately 25 mm. If a larger or smaller median is desired, then the sectors 30 may readily be replaced by another set of sectors each having another same radius of curvature. This can readily be accomplished by removing the fasteners 62 and 63 and replacing the sectors with another set. Each set of sectors may be color or otherwise coded. The sector sets can then be replaced about as simply as changing a tire. All of the fasteners are exposed and readily accessible on the same sides of the stems. The maximum O.D. of the tire component transferred is, of course, limited by the I.D. of the opening 48 in the supporting ring 46.

In addition to the noted variation in the median radius provided by different sets of sectors, it will be appreciated that the axial width, shape, or length of the sectors may vary. Also, the interior of the sectors may be provided with a textured gripping surface. Although FIG. 1 illustrates an in-line transfer for a belt-tread assembly, it will be appreciated that other tire components may be transferred from one location to another along a variety of paths. For example, the transfer may be employed to place the carcass 16 in the proper position with respect to the second stage machine.

It can now be seen that there is provided a purely mechanical tire component transfer not utilizing air bag chucks. Such transfer comprises a series of circular segments adapted to surround and grip the component, such sectors being mounted so that they can be easily removed and replaced by another set of sectors each having another shape or curvature.

I, therefore, particularly point out and distinctly claim as my invention:

1. A tire component transfer comprising a set of circular sectors each having the same radius of curvature, the radially inner surface of said set of circular sectors combining to form one circular support surface made up in circumferential segments by said circular sectors, each sector including a radially extending stem, support means mounting said stems for movement radially to open and close said sectors, and means connecting said support means to the same side of each stem with fasteners projecting from the opposite side of each stem whereby said set may readily be removed and replaced by another set of sectors each having another same radius of curvature, and wherein said support means includes parallelogram link means connected to the same side of each stem.

2. A circular tire component transfer comprising a series of circular segments adapted to surround and grip such component, each segment including a radially outwardly extending stem, the stem of each segment being in a common plane, a support ring for said segments axially offset from the plane of said stems, mounting means interconnecting each stem and said ring for movement of said segments radially, and drive means on said ring connected to each mounting means thus to move said segments, and wherein said mounting means includes a radially extending key for each stem, and a radially extending keyway in each stem adapted to receive said key, and wherein said support ring comprises a radially extending annular plate, and said mounting means comprises axially extending parallel link means connecting said plate and each key.

3. A transfer as set forth in claim 1 including drive means connected to said parallelogram link means operative to move said sectors radially.

4. A transfer as set forth in claim 3 including an annular frame supporting said sectors axially offset therefrom.

5. A transfer as set forth in claim 4 including a ring journalled on said frame, said drive means interconnecting said ring and each parallelogram link means.

6. A transfer as set forth in claim 5 wherein said drive means comprises adjustable tie rods connecting said ring and each said parallelogram link means.

7. A transfer as set forth in claim 5 including means to rotate said ring in one direction to move said sectors radially in one direction, and means to rotate said ring in the opposite direction to move said sectors radially in the opposite direction.

8. A transfer as set forth in claim 6 wherein said annular frame includes a cylindrical portion and a radial portion, said ring being journalled on said cylindrical portion.

9. A transfer as set forth in claim 8 wherein said cylindrical portion extends axially near the I.D. of said radial portion on one side only thereof, said parallelogram link means being pivoted to the opposite side of said radial portion, and windows in said radial portion through which said tie rods extend.

10. A transfer as set forth in claim 9 including an offset on said parallelogram link means, said respective tie rods being connected thereto.

11. A transfer as set forth in claim 2 wherein said support ring includes an axially extending cylindrical ring on the opposite side of said radially extending annular plate from said parallel link means.

12. A transfer as set forth in claim 11 including a drive ring journalled on said cylindrical ring, and tie rod means interconnecting said drive ring and each parallel link means to pivot the latter radially in response to rotation of said drive ring.

13. A transfer as set forth in claim 12 wherein each tie rod is connected to said parallel link means through a window in said radially extending annular plate.

14. A transfer as set forth in claim 13 wherein one of said parallel link means includes a radial offset, said respective tie rod being connected to said offset.

15. A transfer as set forth in claim 14 including spherical joint means connecting each tie rod to said drive ring and offset.

* * * * *